United States Patent
Blömer et al.

(10) Patent No.: US 10,987,852 B2
(45) Date of Patent: Apr. 27, 2021

(54) BLOWING TOOL FOR A BLOW MOLDING MACHINE

(71) Applicant: Kautex Maschinenbau GmbH, Bonn (DE)

(72) Inventors: Michael Blömer, Bonn (DE); Martin Kurek, Troisdorf (DE)

(73) Assignee: KAUTEX MASCHINENBAU GMBH, Bonn (DE)

( * ) Notice: Subject to any disclaimer, the term of this patent is extended or adjusted under 35 U.S.C. 154(b) by 0 days.

(21) Appl. No.: 16/809,803

(22) Filed: Mar. 5, 2020

(65) Prior Publication Data
US 2020/0282625 A1    Sep. 10, 2020

(30) Foreign Application Priority Data

Mar. 5, 2019    (DE) .................... 10 2019 105 538.5

(51) Int. Cl.
| | | |
|---|---|---|
| *B29C 49/58* | (2006.01) | |
| *B29C 49/76* | (2006.01) | |
| *B29C 49/60* | (2006.01) | |
| *B29L 31/00* | (2006.01) | |

(52) U.S. Cl.
CPC ........ *B29C 49/60* (2013.01); *B29C 2049/609* (2013.01); *B29C 2049/6072* (2013.01); *B29L 2031/7158* (2013.01)

(58) Field of Classification Search
CPC . B29C 49/58; B29C 2049/5803; B29C 49/60; B29C 2049/6072; B29C 2049/609; B29C 2049/5841; B29C 2049/5862; B29C 2049/5875; B29C 49/76; B65D 1/023
See application file for complete search history.

(56) References Cited

U.S. PATENT DOCUMENTS

| | | | | |
|---|---|---|---|---|
| 3,408,692 A * | 11/1968 | Schaich | .............. | B29C 49/4242 425/532 |
| 3,608,017 A * | 9/1971 | Cines | ..................... | B29C 49/08 264/529 |
| 3,781,395 A * | 12/1973 | Uhlig | ..................... | B29C 49/08 264/530 |
| 4,195,053 A * | 3/1980 | Lambarth | .............. | B29C 49/32 264/533 |

(Continued)

FOREIGN PATENT DOCUMENTS

| | | | | |
|---|---|---|---|---|
| DE | 1479663 A1 * | 3/1969 | ............ | B29C 49/76 |
| EP | 0361141 A1 | 4/1990 | | |

(Continued)

*Primary Examiner* — Robert B Davis
(74) *Attorney, Agent, or Firm* — Lucas & Mercanti, LLP

(57) ABSTRACT

A blowing tool for a blow molding machine for producing hollow members with an angled neck includes a handling device for the blowing mandrels which enables a biaxial movement of the blowing mandrels within a plane. The blowing tool has a blowing mandrel retention member, wherein at least one blowing mandrel is arranged on the blowing mandrel retention member and each blowing mandrel is arranged in an inclined manner with respect to horizontal at a corresponding angle of inclination. The handling device includes a biaxial system configured to move each blowing mandrel retention member in a first, preferably vertical direction and a second, preferably horizontal direction within a plane.

7 Claims, 2 Drawing Sheets

(56) References Cited

U.S. PATENT DOCUMENTS

| | | | | |
|---|---|---|---|---|
| 5,069,614 A | * | 12/1991 | Belmont | B29C 49/0073 |
| | | | | 425/525 |
| 5,178,817 A | * | 1/1993 | Yamada | B29C 49/0073 |
| | | | | 264/295 |
| 6,814,922 B2 | * | 11/2004 | Mennel | B29C 49/0073 |
| | | | | 264/533 |
| 6,866,922 B2 | * | 3/2005 | Takehara | F16G 1/08 |
| | | | | 428/295.1 |

FOREIGN PATENT DOCUMENTS

| | | |
|---|---|---|
| EP | 2614948 A1 | 7/2013 |
| EP | 3059069 A1 | 8/2016 |

* cited by examiner

BLOWING TOOL FOR A BLOW MOLDING MACHINE

CROSS REFERENCE TO RELATED APPLICATIONS

This application claims priority of DE 102019105538.5, filed Mar. 5, 2019, the entire contents of which are incorporated herein by reference.

BACKGROUND OF THE INVENTION

The invention relates to a blowing tool for a blow molding machine for producing hollow members with an angled neck. The blowing tool includes a handling device for temporarily introducing at least one blowing mandrel into a blow mold and for calibrating the angled neck.

Hollow members having an angled neck are, for example, angle-necked bottles for receiving liquid filling material. An opening of the hollow member and, where applicable, a closure are arranged in the region of the angled neck.

In blow molding technology, the term "calibrated opening" refers to an opening which during the shaping is produced by cooperation of components of the blowing tool, such as, for example, a neck insert or portions of the blow mold and the blowing mandrel.

From the prior art, calibration by a tool closure movement and calibration by a blowing mandrel movement are known. Furthermore, a calibration in accordance with the trailing mandrel method is known in which the blowing mandrel already protrudes into the preform when the tool closes.

A known blowing tool for a blow mold machine for producing hollow members with an angled neck comprises a handling device which moves the blowing mandrel back and forth in a uniaxial manner for temporary introduction into the blow mold in the direction of the longitudinal axis thereof.

After the introduction of the blowing mandrel into the cavity of the blow mold, the preforms are separated with an angled cut using a rotatable blade. Subsequently, the blowing mandrels which are inclined relative to horizontal are introduced into the blow mold by the uniaxial movement.

The known blowing tool for producing hollow members with an angled neck has the disadvantage that, in the event of a change of article, an adaptation of the angle of inclination of the blowing mandrels to differently inclined portions of blow molds in order to form the angled neck is complex. Another decisive disadvantage of the uniaxial movement of the blowing mandrels in the direction of the longitudinal axis thereof is the resultant large structural space of the blowing tool of the blow molding machine.

BRIEF SUMMARY OF THE INVENTION

Based on this prior art, an object of the invention is to provide a blowing tool for a blow molding machine for producing hollow members with an angled neck which requires only a small structural space and which facilitates the introduction of the blowing mandrels into the blow mold. In a particularly preferred embodiment of the invention, the blowing tool enables a simple adaptation of the angle of inclination of the blowing mandrels to differently inclined portions of blow molds in the event of an article change.

The solution to the problem is based on the notion of providing a handling device that enables a biaxial movement of the blowing mandrels within a plane.

The object is achieved with a blowing tool having at least one blowing mandrel retention member, with at least one blowing mandrel arranged on each blowing mandrel retention member. Each blowing mandrel is arranged in an inclined manner with respect to horizontal at a corresponding angle of inclination. A handling device for introducing the at least one blowing mandrel into the blow mold comprises a biaxial system which is configured to move each blowing mandrel retention member in a first direction and a second direction which is different from the first direction within a plane.

As a result of the biaxial movement, the feeding and introduction of the blowing mandrels into the inclined portions of the blow mold in order to form the angled neck even under unfavorable spatial relationships is facilitated. The division of the feeding and introduction movement into two independent movement components, in particular a vertical and a horizontal component, additionally reduces the structural space of the blowing tool and consequently the structural space required by the blow molding machine. Furthermore, depending on the geometry of the angled neck, it is possible to dispense with the angled cut which was previously generally required.

The biaxial system for moving the blowing mandrel retention members is preferably formed by two uniaxial linear guides having a first drive unit for moving each blowing mandrel retention member in the first, preferably vertical direction and a second drive unit for moving each blowing mandrel retention member in the second, preferably horizontal direction.

A drive control of the first and second drive units is configured in such a manner that each blowing mandrel, while the blowing mandrel is introduced into the blow mold, is moved exclusively in a direction of a longitudinal axis of the each blowing mandrel. This movement is preferably produced by a superimposed movement of each blowing mandrel retention member in a horizontal direction and a vertical direction. Depending on the angle of inclination of the blowing mandrels, the difference between the speed of the movement in the vertical direction and the horizontal direction for the introduction movement is intended to be determined. Until the beginning of the introduction movement, the blowing mandrel block can be moved with feed movements at freely selectable speeds in a vertical and/or horizontal direction with optimum use of the spatial relationships in the blow molding machine.

In a particularly advantageous embodiment of the invention, each blowing mandrel retention member is releasably secured to the handling device. In the event of an article change, it is only necessary to also secure each blowing mandrel retention member to the handling device with an angle of inclination of the blowing mandrels which is adapted to the changed blow mold. The releasable securing can be carried out, for example, by screws or with securing means which can be handled without tools, such as, for example, rapid clamping systems.

In a preferred embodiment of the invention, the blowing tool has only one blowing mandrel retention member which is constructed as a blowing mandrel block. The blowing mandrel block contains air channels for supplying the blowing air and cooling channels for supplying coolant to the blowing mandrels. The blowing mandrel block obviates the need for complex pipework of each blowing mandrel for supply with blowing air and coolant, which is conventional with separate blowing mandrel retention members for each blowing mandrel. Furthermore, in the event of an article change, only one blowing mandrel retention member has to be changed.

In another embodiment of the invention, the angle of inclination of each blowing mandrel may be adjustable with respect to the horizontal. The adjustment is carried out by an articulation between the blowing mandrel retention member and blowing mandrel. Without changing the blowing mandrel retention member(s), a simple adaptation of the inclination angle of the blowing mandrels to differently inclined portions of blow molds in the event of an article change is possible.

BRIEF DESCRIPTION OF THE DRAWINGS

The invention is explained in greater detail below with reference to the drawings, in which.

DETAILED DESCRIPTION OF THE PREFERRED EMBODIMENTS

Figure 1:
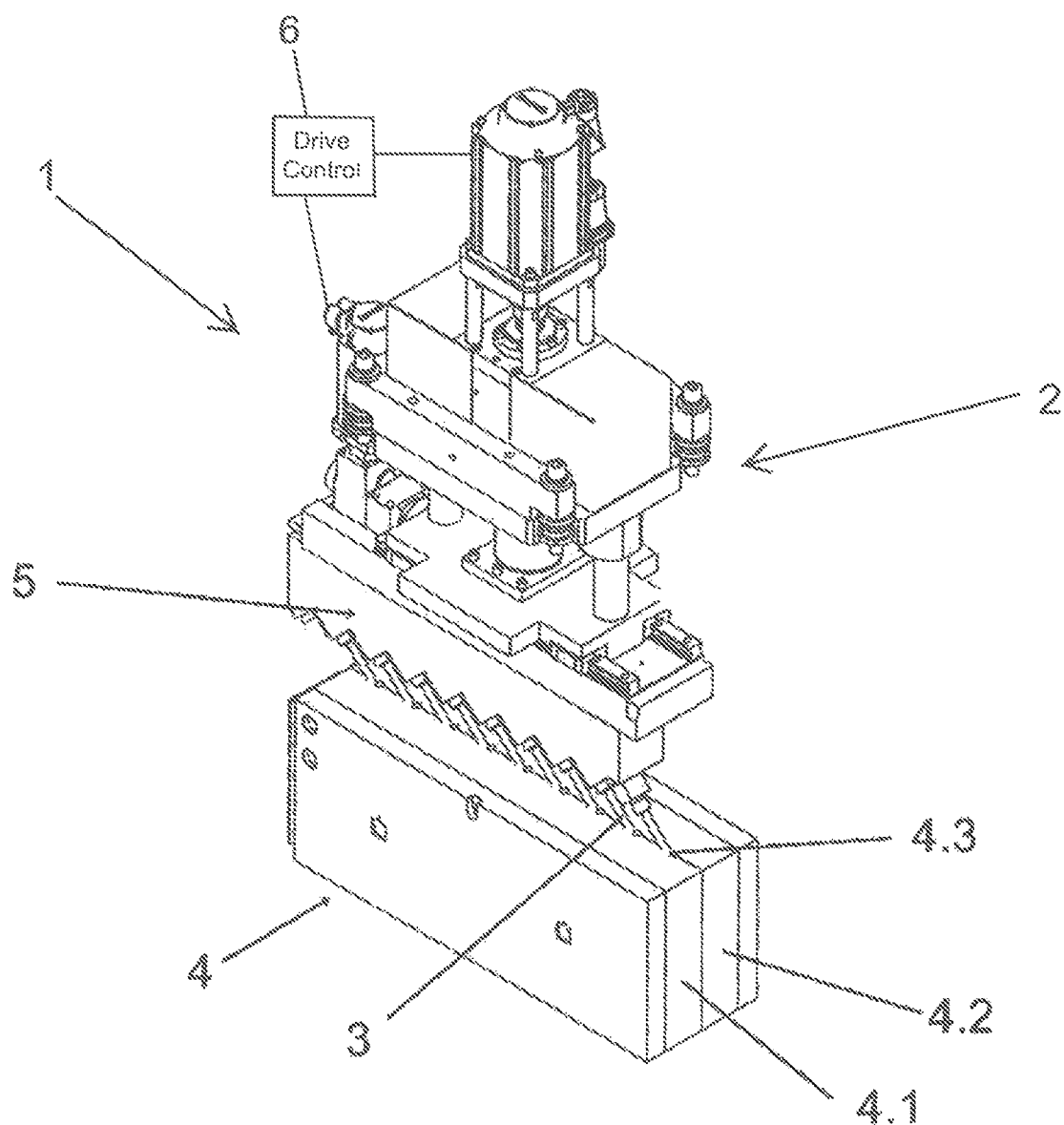
FIG. 1 is a perspective illustration of a blowing tool according to an embodiment of the present invention.

FIG. 1 shows a blowing tool (1) for a blow molding machine for producing hollow members with an angled neck (the hollow members are not illustrated). The blowing tool (1) comprises a handling device (2) for temporarily introducing a total of nine blowing mandrels (3) into a blow mold (4).

The blowing mandrels (3) are arranged on a blowing mandrel retention member (5), which is constructed as a blowing mandrel block in the embodiment of FIG. 1, at a corresponding angle of inclination of 45° with respect to horizontal and are temporarily supplied with blowing air by a compressed air source which is not illustrated, and cooled by a water cooling system which is not illustrated. The blowing mandrel block contains air channels for supplying the blowing air and cooling channels for supplying coolant to the blowing mandrels (3). The use of the blowing mandrel block obviates the requirement for complex pipework for supplying blowing air and coolant to each blowing mandrel (3).

The blow mold (4) comprises two mold halves (4.1, 4.2) which delimit the cavities for forming the hollow members with angled necks. The blowing mandrels (3) are introduced into the previously received preforms in the blow mold (4) through openings (4.3) arranged on the upper side of the blow mold (4), between the closed mold halves (4.1, 4.2) and adjacent portions for forming the angled neck.

The handling device (2) for moving the blowing mandrel block in a horizontal direction (H) and vertical direction (V) is constructed as a biaxial system. The first uniaxial linear guide in a vertical direction (V) is formed by first and second vertical guiding elements (2.1), (2.2). The first vertical guiding element (2.1) is constructed in the embodiment as a bush and the second vertical guiding element (2.2) is constructed as a rail.

The second uniaxial linear guide in a horizontal direction (H) is formed by first horizontal guiding elements (2.5) and a second horizontal guiding element (2.6). The first horizontal guiding elements (2.5) are constructed in the embodiment as guiding shoes and the second horizontal guiding element (2.6) is constructed as a guide rail.

The first uniaxial linear guide comprises a first drive unit (2.3), which drives a ballscrew (2.8) that is used to move an intermediate plate (2.9) secured to the vertical guiding elements (2.2) at the end side, back and forth in a vertical direction. As an alternative to the ballscrew, for example, a planetary screw drive or a rack and pinion drive may be used.

On the intermediate plate (2.9) which can be moved in a vertical direction (V), the guiding shoes for horizontally guiding the guide rail are secured. The guiding shoes guide in a longitudinally displaceable manner in a horizontal direction (H) the guide rail which is securely connected to a cross-member (2.7). On the cross-member (2.7), there is arranged a second drive unit (2.4) which moves the cross-member (2.7) in a horizontal direction (H) with respect to the intermediate plate (2.9).

The blowing mandrel block of the blowing mandrel retention member (5) is releasably secured to the lower side of the cross-member (2.7).

Figure 2A:
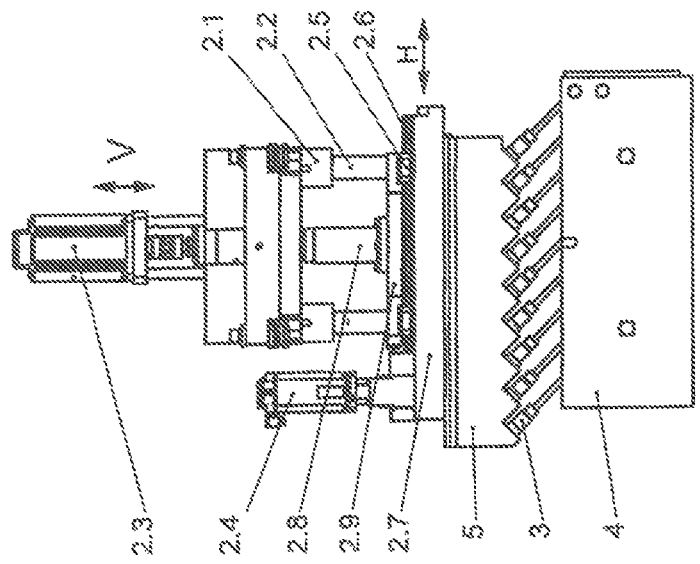
FIG. 2a is a side view of the blowing tool according to FIG. 1 before the blowing mandrels are introduced into the blow mold.
Figure 2B:
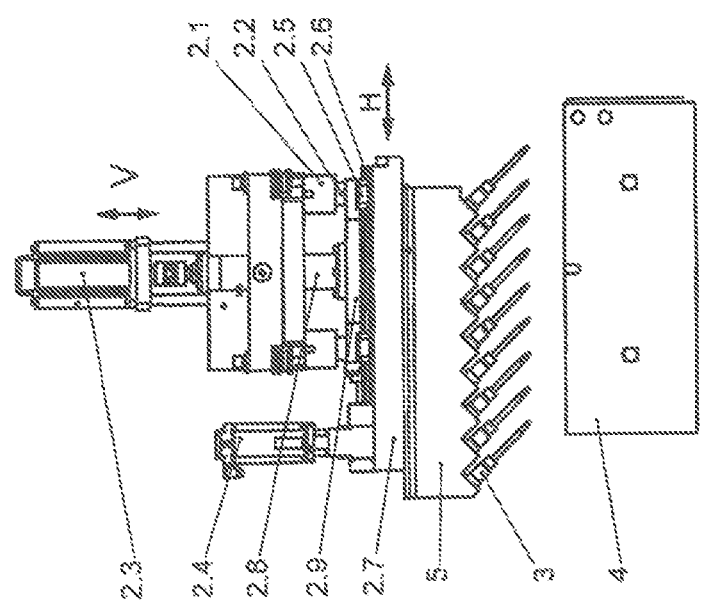
FIG. 2b is a side view the blowing tool according to FIG. 2a during the introduction of the blowing mandrels into the blow mold.

In order to initiate the blowing operation with the blowing tool (1) according to the invention, the blowing mandrels (3) can be lowered from the position illustrated in FIG. 2a with a feed movement in a vertical direction (V) until the tips of the blowing mandrels (3) are located above the openings (4.3). Subsequently, the first and second drive units (2.3, 2.4) move the blowing mandrel block at a corresponding vertical and horizontal speed so that each blowing mandrel (3) during the introduction movement moves exclusively in the direction of the longitudinal axis (L) of each blowing mandrel (3).

With an angle of inclination of the longitudinal axis (L) with respect to the horizontal which differs from 45°, a drive control (6) of the first and second drive unit (2.3, 2.4) (see FIG. 1) adapts the speed of the movement of the blowing mandrel block in a vertical and horizontal direction accordingly so that each blowing mandrel (3) during the introduction movement moves exclusively in the direction of the longitudinal axis (L) thereof.

Figure 2C:
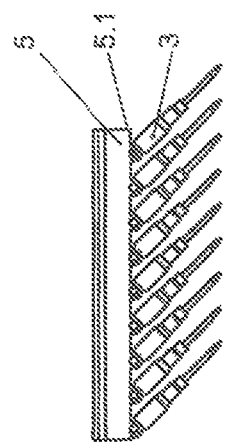
FIG. 2c is a side view of a modified embodiment of the blowing mandrel retention member.

FIG. 2c shows a modified embodiment of the blow mold retention member (5) which is constructed as a blow mold block. The angle of inclination of each blowing mandrel (3) with respect to the horizontal can be adjusted. The adjustment is carried out by an articulation (5.1) between the blowing mandrel retention member (5) and each blowing mandrel (3).

LIST OF REFERENCE NUMERALS

| No. | Designation |
|---|---|
| 1 | Blowing tool |
| 2 | Handling device |
| 2.1 | First vertical guiding element |
| 2.2 | Second vertical guiding element |
| 2.3 | First drive unit |
| 2.4 | Second drive unit |
| 2.5 | First horizontal guiding element |
| 2.6 | Second horizontal guiding element |
| 2.7 | Cross-member |
| 2.8 | Ballscrew |
| 2.9 | Intermediate plate |
| 3 | Blowing mandrels |
| 4 | Blow mold |

-continued

| No. | Designation |
|---|---|
| 4.1 | Mold half |
| 4.2 | Mold half |
| 4.3 | Openings |
| 5 | Blowing mandrel retention member |
| 5.1 | Articulation |
| 6 | Drive control |

What is claimed is:

1. A blowing tool for a blow molding machine for producing hollow members with angled necks, comprising:
a blow mold delimiting at least one cavity for forming a hollow member with an angled neck;
a blowing mandrel retention member;
at least one blowing mandrel arranged on the blowing mandrel retention member, each said at least one blowing mandrel having a longitudinal axis inclined with respect to horizontal at an angle of inclination; and
a handling device for temporarily introducing the at least one blowing mandrel into the blow mold and for calibrating the angled necks of the hollow members to be produced, the handling device including a biaxial system configured to move the blowing mandrel retention member in a first direction and a second direction which is different from the first direction within a plane.

2. The blowing tool according to claim 1, wherein the first direction is a vertical direction (V) and the second direction is a horizontal direction (H).

3. The blowing tool according to claim 1, wherein the biaxial system has a first uniaxial linear guide, a second uniaxial linear guide, and a first drive unit for moving the blowing mandrel retention member in the first direction along the first uniaxial linear guide, and a second drive unit for moving the blowing mandrel retention member in the second direction along the second uniaxial linear guide.

4. The blowing tool according to claim 3, further comprising a drive control of the first drive unit and the second drive unit configured so that the at least one blowing mandrel is moved exclusively in a direction of a longitudinal axis (L) of the at least one blowing mandrel, when the blowing mandrel is introduced into the blow mold.

5. The blowing tool according to claim 1, wherein the blowing mandrel retention member is releasably arranged on the handling device.

6. The blowing tool according to claim 1, wherein the blowing mandrel retention member is a blowing mandrel block containing air channels for supplying blowing air and cooling channels for supplying coolant to the at least one blowing mandrel.

7. The blowing tool according to claim 1, wherein the angle of inclination of each said at least one blowing mandrel is adjustable with respect to the horizontal by an articulation.

* * * * *